(12) United States Patent  (10) Patent No.: US 8,080,098 B2
Kurihara et al.  (45) Date of Patent: Dec. 20, 2011

(54) WATER-BASED INK COMPOSITION

(75) Inventors: Norimasa Kurihara, Osaka (JP); Shoko Matsumoto, Setagaya (JP); Kyoko Sano, Osaka (JP); Yasunori Nakatani, Osaka (JP); Hiroyoshi Yamamoto, Osaka (JP); Kozaburo Fujita, Osaka (JP); Hiroshi Inoue, Osaka (JP); Takeshi Omatsu, Osaka (JP); Shigeki Yoneda, Osaka (JP); Tomohiro Sawa, Osaka (JP)

(73) Assignee: Sakura Color Products Corporation, Osaka-shi (JP)

( * ) Notice: Subject to any disclaimer, the term of this patent is extended or adjusted under 35 U.S.C. 154(b) by 460 days.

(21) Appl. No.: 11/659,592

(22) PCT Filed: Aug. 8, 2005

(86) PCT No.: PCT/JP2005/014511
§ 371 (c)(1),
(2), (4) Date: Feb. 6, 2007

(87) PCT Pub. No.: WO2006/014004
PCT Pub. Date: Feb. 9, 2006

(65) Prior Publication Data
US 2007/0203259 A1    Aug. 30, 2007

(30) Foreign Application Priority Data
Aug. 6, 2004  (JP) .................... 2004-231516
Nov. 19, 2004 (JP) .................... 2004-335308

(51) Int. Cl.
*C09D 11/16* (2006.01)

(52) U.S. Cl. .............. 106/31.25; 106/31.4; 106/31.72
(58) Field of Classification Search ............ 106/31.25, 106/31.4, 31.72; 523/160
See application file for complete search history.

(56) References Cited

U.S. PATENT DOCUMENTS

| 4,880,465 | A | * | 11/1989 | Loria et al. ............... 106/31.13 |
| 5,510,397 | A | * | 4/1996 | Okuda et al. .............. 523/161 |
| 5,683,500 | A | * | 11/1997 | Kawasumi et al. .......... 106/31.6 |
| 5,977,211 | A | * | 11/1999 | Koyama .................... 523/161 |
| 6,037,391 | A | * | 3/2000 | Iida ....................... 523/161 |
| 2001/0016142 | A1 | * | 8/2001 | Koyama .................... 401/222 |

FOREIGN PATENT DOCUMENTS

JP  57-16384   1/1982
JP  2-133479   5/1990

(Continued)

OTHER PUBLICATIONS

English Abstract of JP 2002-256174.*

*Primary Examiner* — Jerry Lorengo
*Assistant Examiner* — Veronica F Faison
(74) *Attorney, Agent, or Firm* — Hamre, Schumann, Mueller & Larson, P.C.

(57) ABSTRACT

In a water-based ink composition of the present invention, 2.5 to 50 wt % of white-colored resin particles and 2.5 to 50 wt % of film-forming resin emulsions in a solid content are contained with respect to the total amount of the ink, the ratio of said white-colored resin particles to film-forming resin emulsions is 1:0.2 to 1:3, and not less than 20 wt % of said white-colored resin particles and film-forming resin emulsions in a solid content are contained in total.

16 Claims, 8 Drawing Sheets

FOREIGN PATENT DOCUMENTS

| | | |
|---|---|---|
| JP | 7-3200 | 1/1995 |
| JP | 7-266778 | 10/1995 |
| JP | 7-268264 | 10/1995 |
| JP | 9-157574 | 6/1997 |
| JP | 63-56579 | 3/1998 |
| JP | 63-273672 | 11/1998 |
| JP | 2001-89689 | 4/2001 |
| JP | 2001-192595 | 7/2001 |
| JP | 2001-192596 | 7/2001 |
| JP | 2001-510222 | 7/2001 |
| JP | 2002256174 A * | 9/2002 |
| JP | 2002-362004 | 12/2002 |
| JP | 2004-10846 | 1/2004 |
| JP | 2004-175827 | 6/2004 |
| JP | 2004-27081 | 1/2006 |
| WO | 99/03934 | 1/1999 |

* cited by examiner

US 8,080,098 B2

WATER-BASED INK COMPOSITION

BACKGROUND OF THE INVENTION

1. Field of the Invention

The present invention relates to a water-based ink composition capable of forming a raised three-dimensional hand writing with a matted surface and to a writing instrument containing said ink.

2. Description of the Prior Art

Conventionally, a three dimensional ink comprising a binder, a colorant, and a light weight filler has been provided (patent document 1). By this ink, it is described, a light weight fine particle filler is engulfed in a film formed by a binder thereby capable of obtaining three dimensional characters, figures, and the like.

Patent document 1: The Unexamined Japanese Patent Laid-Open publication No. Sho 63-273672, page 1 and lower right column, lines 12 to 15 of page 4.

However, the ink of said patent document forms a three-dimensional handwriting by using a light weight fine particle filler hardened by a binder, that is, it can be said that the light weight fine particle filler makes up the three-dimensional film-forming component.

The object of the present invention is to provide a water-based ink composition capable of forming an enough raised three-dimensional handwriting with a matted surface without compounding a light weight fine particle filler.

SUMMARY OF THE INVENTION

As a result of intensive studies to achieve the above mentioned object, the present invention has employed a water-based ink composition containing 2.5 to 50 wt % of white-colored resin particle dispersions in a solid content with respect to the total amount of the ink, 2.5 to 50 wt % of film-forming resin emulsions in a solid content with respect to the total amount of the ink, wherein the ratio of said white-colored resin particles to said film-forming resin emulsions is 1:0.2 to 1:3 in a solid content and said white-colored resin particles and said film-forming resin emulsions in a solid content are contained in not less than 20 wt % in total.

Thus, in the ink for a writing instrument of the present invention, by specifying the ratio in a solid content of white-colored resin particles and resin emulsions, a handwriting with a matted surface can be obtained, and by increasing the solid content of said film-forming resin emulsions, a raised hand writing can be formed.

Therefore, by the ink for a writing instrument of the present invention, an enough raised three-dimensional hand writing with a matted surface can be formed without compounding a light weight fine particle filler.

Figure 1:
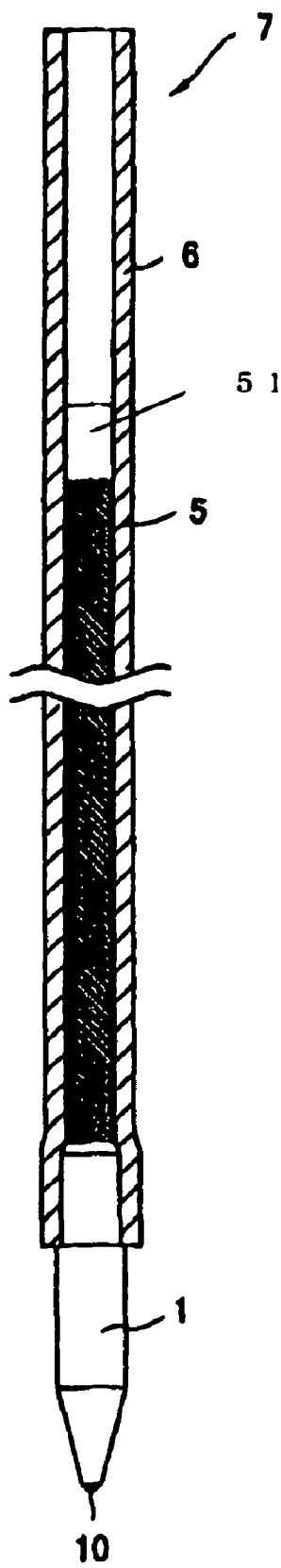
FIG. 1 is a cross-section showing a core employing one embodiment of a ball-point pen tip related to the writing instrument of the present invention.

DESCRIPTION OF THE PREFERRED EMBODIMENTS (White-Colored Resin Particles)

As white-colored resin particles used in the present invention, various kinds of the white-colored resin particles can be used such as spherical, flat, hollow, and the like. In particular, flat and hollow ones can preferably be used and such white-colored resin particles can be compounded in an ink as dispersions. Further, not less than two kinds of resin particles such as spherical, flat, hollow, and the like can be used in a mixture. Water can be included in dispersions. In addition, white-colored resin particles whose average particle diameter of 0.05 to 1.5 µm can be used. Regarding the white-colored resin particles used in the present invention, the ones whose average particle diameter of not greater than 1.5 µm can preferably be used.

As white-colored resin particles used in the present invention, for example, a trade name "MR2G" (manufactured by Soken Chemical and Engineering Co., Ltd., rigid (tightly compacted) white-colored resin particles, average particle diameter 1.0 µm) can be exemplified. In addition, trade names "Muticle PP240D" (manufactured by Mitsui Toatsu Chemicals Inc., flat white-colored resin particles, dispersion, average particle diameter: 0.5 µm), "Ropaque ultra (manufactured by Rohm and Haas Company, hollow white-colored resin particles, dispersion, average particle diameter: 0.3 µm) can be exemplified. Further, trade names "Ropaque HP1055 (manufactured by Rohm and Haas Company, hollow white-colored resin particles, dispersion, average particle diameter: 1.0 µm), "Ropaque HP91" (manufactured by Rohm and Haas Company, hollow white-colored resin particles, dispersion, average particle diameter: 1.0 µm), "Ropaque OP84J" (manufactured by Rohm and Haas Company, hollow white-colored resin particles, dispersion, average particle diameter: 0.55 µm), "Ropaque HP433J" (manufactured by Rohm and Haas Company, hollow white-colored resin particles, dispersion, average particle diameter: 0.40 µm), "Muticle 110C" (manufactured by Mitsui Toatsu Chemicals Inc., particles of fine particle aggregates, dispersion, average particle diameter: 1.0 µm), "MH5055" (manufactured by Zeon Corporation, hollow white-colored resin particles, dispersion, average particle diameter: 0.5 µm), "LX407BP" rigid (tightly compacted) white-colored resin particles, dispersion, average particle diameter: 0.4 µm), and "LX407BP6" rigid (tightly compacted) white-colored resin particles, dispersion, average particle diameter: 0.2 µm) can be exemplified. Further, trade names "SX866(A)" (manufactured by JSR Corporation, hollow white-colored resin particles, dispersion, average particle diameter 0.3 µm), "SX866(B)" (manufactured by JSR Corporation, hollow white-colored resin particles, dispersion, average particle diameter 0.3 µm), "SX866(C)" (manufactured by JSR Corporation, hollow white-colored resin particles, dispersion, average particle diameter 0.3 µm), "SX866 (D)" (manufactured by JSR Corporation, hollow white-colored resin particles, dispersion, average particle diameter 0.3 µm), "SX8782(D)" (manufactured by JSR Corporation, hollow white-colored resin particles, dispersion, average particle diameter 1.0 µm), "SX8782(A)" (manufactured by JSR Corporation, hollow white-colored resin particles, dispersion, average particle diameter 1.1 µm), a trade name "SX8782(P)" (manufactured by JSR Corporation, hollow white-colored resin particles, dispersion, average particle diameter 1.1 µm) can be exemplified.

It is preferable that these white-colored resin particles are contained in 2.5 to 50 wt % with respect to the total amount of the ink and in particular, that they are contained in 5 to 30 wt % with respect to the total amount of the ink. In the case of a dispersion, it is preferable that the dispersion is contained in 2.5 to 50 wt % in a solid content with respect to the total amount of the ink and in particular, that it is contained in 5 to 30 wt % in a solid content with respect to the total amount of the ink. When the white-colored resin particles are contained in less than 2.5 wt % with respect to the total amount of the ink, since the solid content is too small, the rise of a handwriting is degraded and in addition, glitter is liable to be generated in a handwriting thereby making it difficult to form a matted handwriting. On the other hand, when the white-colored resin particles are contained in excess of 50 wt % with respect to the total amount of the ink, since too many resin particles are present, the stability of the ink with time passage is deteriorated thereby making it difficult to form a matted handwriting. In order to secure stability of the ink with time passage and raised handwriting, it is desired that these white-colored resin particles are contained in 5 to 30 wt % with respect to the total amount of the ink.

(Film-Forming Resin Emulsions)

As film-forming resin emulsions used in the present invention, acrylic series resin emulsions, urethane series resin emulsions, styrene butadiene (SBR) series resin emulsions, acrylonitrile butadiene series resin emulsions, and the like can be used.

As acrylic series resin emulsions, for example, trade names "Boncoat 3218" (manufactured by Dainippon Ink and Chemicals Incorporated), "Boncoat R137" (manufactured by Dainippon Ink and Chemicals Incorporated), "Boncoat AN865" (manufactured by Dainippon Ink and Chemicals Incorporated), and "Boncoat AB883" (manufactured by Dainippon Ink and Chemicals Incorporated) can be exemplified. Further, trade names "Polyzol PSA SE1300" (manufactured by Showa Highpolymer Co., Ltd.), "Polyzol PSA SE4100" (manufactured by Showa Highpolymer Co., Ltd.), "Polyzol AP5530" (manufactured by Showa Highpolymer Co., Ltd.), "Polyzol AP5600" (manufactured by Showa Highpolymer Co., Ltd.) can be exemplified. Further, trade names "Nikazol RX866D" (manufactured by Nippon Carbide Industries Co., Inc.), "Nikazol RX878A" (manufactured by Nippon Carbide Industries Co., Inc.), "Nikazol RX210" (manufactured by Nippon Carbide Industries Co., Inc.), "AE513A" (manufactured by JSR Corporation), "AE517" (manufactured by JSR Corporation), and "AE311" (manufactured by JSR Corporation) can be exemplified.

As styrene butadiene (SBR) series resin emulsions, for example, trade names "Racstar 5215A" (manufactured by Dainippon Ink and Chemicals Incorporated), "Racstar 4709EL" (manufactured by Dainippon Ink and Chemicals Incorporated), "Racstar DS813" (manufactured by Dainippon Ink and Chemicals Incorporated), "0561" (manufactured by JSR Corporation), "2108" (manufactured by JSR Corporation), "0548" (manufactured by JSR Corporation), and "0545" (manufactured by JSR Corporation) can be exemplified.

As acrylonitrile butadiene series resin emulsions, for example, trade names "Racstar 4940B" (manufactured by Dainippon Ink and Chemicals Incorporated) and "Racstar 68-073S" (manufactured by Dainippon Ink and Chemicals Incorporated) can be exemplified.

As methacrylic acid methyl butadiene series resin emulsions, for example, trade names "Racstar DM812" (manufactured by Dainippon Ink and Chemicals Incorporated) and "Racstar DM886" (manufactured by Dainippon Ink and Chemicals Incorporated) can be exemplified.

As urethane series resin emulsions, trade names "Ucoat UW145" (manufactured by Sanyo Chemical Industries Ltd), "Ucoat UX2505" (manufactured by Sanyo Chemical Industries Ltd), "Superflex 107M" (manufactured by Daiichi Kogyo Seiyaku Co., Ltd.), "Superflex 361" (manufactured by Daiichi Kogyo Seiyaku Co., Ltd), and "Superflex 500" (manufactured by Daiichi Kogyo Seiyaku Co., Ltd) can be exemplified.

Among the above mentioned examples, in particular, acrylic series emulsions can preferably be used.

It is preferable that these film-forming resin emulsions are contained in 2.5 to 50 wt % in a solid content with respect to the total amount of the ink, and in particular, that it is contained in 5 to 30 wt % in a solid content with respect to the total amount of the ink. When these resin emulsions are contained in less than 2.5 wt % with respect to the total amount of the ink, since the solid content is too small, the rise of a handwriting is degraded and in addition, glitter is liable to be generated in a handwriting thereby making it difficult to form a matted handwriting. On the other hand, when these resin emulsions are contained in excess of 50 wt % with respect to the total amount of the ink, since too many resin particles are present, the stability of the ink with time passage is deteriorated thereby making it difficult to form a matted handwriting. In order to secure stability of the ink with time passage and raised handwriting, it is desired that these film-forming resin emulsions are contained in 5 to 30 wt % with respect to the total amount of the ink. Water is included in the film-forming resin emulsions.

In addition, it is preferable that the glass transition temperature of said film-forming resin emulsions is not greater than 0° C. When the glass transition temperature of said film-forming resin emulsions exceeds 0° C., cracks are liable to be generated in a handwriting.

(Ratio of White-Colored Resin Particles to Film-Forming Resin Emulsions in a Solid Content and the Total Solid Content)

In addition, in the present invention, it is important that the ratio of a solid content of said white-colored resin particles and said resin emulsions is 1:0.2 to 1:3 to make a handwriting with matted tone. When the ratio of said resin emulsions to said white-colored resin particles is in excess or insufficient, in both cases, glitter is generated in a handwriting. In particular, it is preferable that the ratio of said white-colored resin particles and said film-forming resin emulsions is 1:0.5 to 1:2 to make a handwriting with more matted tone.

Further, in order to raise the handwriting, it is important that a solid content of both said white-colored resin particles and said film-forming resin emulsions is not less than 20 wt % in total with respect to the total amount of the ink.

(Colorant)

In the present invention, a colored colorant can be used. As a colorant used in the present invention, for example, other than a water-soluble dye such as an acid dye, a direct dye, a base dye, and the like, an inorganic pigment such as carbon black, titanium oxide, silica of alumina, talc, and the like, an organic pigment such as an azo pigment, a naphthol pigment, a phthalocyanine pigment, a threne pigment, a quinacridone pigment, an anthraquinone pigment, a dioxane pigment, a dioxadine pigment, an indigo pigment, a thioindigo pigment, a perinone pigment, a perylene pigment, an indolenone pigment, an azomethine pigment, a metal powder pigment such as an aluminum powder pigment, a bronze powder pigment, and the like, a fluorescent pigment, a pearlescent pigment, a glittering pigment and the like can be exemplified. In addition, these pigments can be used in pigment dispersions. Further, in the present invention, these colorants can be used alone or in combinations of two or more of them.

As the above mentioned glittering pigment, for example, a metal coated glass flake pigment, a metal coated inorganic pigment, a metal oxide coated inorganic pigment, a metal powder pigment such as an aluminum powder pigment and the like, a metal foil, a film deposited by a metal, a metal-vapor deposition membrane (for example, a metal-vapor deposition membrane obtained by peeling off a vapor-deposited metal layer on a film), and the like can be exemplified. Here, a metal glass flake pigment is defined as a pigment composed of a structure in which a flaky glass is coated with a metal (alloy). Further, a metal coated inorganic pigment is defined as a generic term of an inorganic pigment coated with a metal (alloy). An inorganic pigment coated with metal oxide (for example, metal pigment such as aluminum pigment coated with metal oxide) can also be used.

In addition, various kinds of opacifying pigments such as inorganic pigments or organic white pigments including titanium oxide, alkylene bismelamine derivatives, and the like can be used alone or in combinations.

Further, as a colorant, scaly silica can be used. Scaly silica has function of enhancing an opacifying property in combinations with white-colored resin particles and has higher matting effect. In addition, since a scaly silica is scaly shaped, it is hard to settle with passage of time thereby having a property of not damaging the dispersal stability of an ink. Scaly silica is commercially available in a powdery and in a slurry state and the powdery examples include, for example, trade names of SUNLOVELY (average particle diameter 4 to 6 μm), SUNLOVELY C (average particle diameter 4 to 6 μm), and SUNLOVELY TZ-824 (average particle diameter 4 to 6 μm), manufactured by Doukai Chemical Industry Co., Ltd., and the like. Slurry examples include, for example, trade names of SUNLOVELY LFS HN-020 (average particle diameter 0.2 μm), SUNLOVELY LFS HN-050 (average particle diameter 0.5 μm), and SUNLOVELY LFS HN-150 (average particle diameter 1.5 μm), manufactured by Doukai Chemical Industry Co., Ltd., and the like. With regard to matted tone and dispersal stability, particle diameter of 0.2 to 6 μm is preferable. In specific, SUNLOVELY LFS HN-020 (average particle diameter 0.2 μm) and SUNLOVELY LFS HN-050 (average particle diameter 0.5 μm) are preferably used.

A colorant used in the present invention is preferably contained in 0.01 to 20 wt %, preferably not less than 0.01 to less than 15 wt %, and more preferably 0.01 to 10 wt % with respect to the total amount of the water-based ink composition. When the content of the above mentioned colorant is less than 0.01 wt % with respect to the total amount of said composition, coloring of said colorant is hard to be recognized by visual observation. When the content of the colorant exceeds 20 wt % with respect to the total amount of said composition, viscosity gets so high that fluidity lowers.

(Perfume)

In the ink of the present invention, perfume can be included. By including perfume, a matted handwriting film formed can be formed in which scent of perfume can be maintained by discharging scent three-dimensionally. In particular, when perfume is a general oily perfume, since perfume is not mixed with water in a normal condition, the content to be added should be reduced or a solvent should be added when used in a water-based state, however, when the above mentioned perfume is included in the ink composition of the present invention, since said composition includes the above mentioned film-forming synthetic resin emulsions, resin particles of said film-forming synthetic resin emulsions present as the emulsions can take in said perfume, thereby capable of preparing a water-based ink composition including resin particles of said film-forming synthetic resin emulsions with said perfume taken in. By this, despite a water-based ink composition, perfume which is an oil content does not separate and therefore, the scent of perfume can be practically maintained discharging scent from a matted three-dimensional handwriting film, and further, since a plenty of perfumes can be included, a three-dimensional handwriting film which can sustain scent of perfume and control strength of perfume can be formed.

As preferable perfume which can be used in the present invention, Plum NS-D5972, Cherry blossom NS-D5973, Chrysanthemum NS-D5974, Chinese bellflower NS-D5975, Wisteria NS-D596, Perfume NS-D5882 (mint), Perfume NS-D5929 (musk), Grapefruit NS-F5239, Strawberry NS-F5240, Lemon NS-G5883, Ultramarine NS-G5885, Peppermint NS-F5241, Peach NS-F5242, Orange NS-F5243, Green Apple NS-F5244, Blueberry NS-F5245, Lavender NS-F5246, Vanilla NS-F5247, Banana NS-F5248, Soap (scent of soap) NS-F5249, Perfume NS-F5210, Jasmin NS-D5812, Plum NS-D5972, Citrus NS-D5499, Rose NS-E5798, Lavender NS-E5442, Rose NS-E5443, Mint NS-E5444, Hinoki NS-D5015, Fragrance NS-G5000, Fragrance NS-G5001, Fragrance NS-G5002, Fragrance NS-G5003, Fragrance NS-G5004, Fragrance NS-G5005, Fragrance NS-G5006, Fragrance NS-F5992, Fragrance NS-F5993, Fragrance NS-F5994, Fragrance AN NS-G5253, Fragrance RS NS-G5254, Fragrance EV NS-G5255, Fragrance BL NS-G5256, Fragrance EP NS-G5257, Fragrance LR NS-G5258, Fragrance MR NS-G5259, Fragrance HP NS-G5260, Fragrance SW NS-G5261, and the like are exemplified.

It is preferable that these perfumes are so included that the weight ratio of the solid content of said adhesive synthetic resin emulsions and said perfumes is 2:1 to 40:1 in order that perfumes are preferably taken in resin particles of emulsion and that preferable fragrance of perfumes are kept.

In the ink of the present invention, water is included. It is preferable that water is contained in 20 to 80 wt % with respect to the total amount of the ink composition.

(Other Components)

Further, in the ink of the present invention, water, a water-soluble organic solvent, a surfactant, an antiseptic mildew-proofing agent, a rust inhibitor, an anti-foaming agent, a thickening agent, and the like can be included. Water is compounded as remnant of components included in the ink composition.

In addition, as the above mentioned thickening agent, water-soluble thickening agents, for example, microbial polysaccharide and derivative thereof are used. For example, pullulan, xanthan gum, welan gum, rhamsan gum, succinoglucan, dextran, and the like can be exemplified. Water-soluble plant polysaccharides and the derivatives thereof are also used. For example, taraganth gum, guar gum, tara gum, locust bean gum, gati gum, arabino garactan gum, gum Arabic, quince seed gum, pectin, starch, psyllium seed gum, pectin, carageenan, arginic acid, agar, and the like can be exemplified. Moreover, a water-soluble animal polysaccharide and derivative thereof are also used. For example, gelatin, casein, albumin, can be exemplified. Further, as a water-soluble thickening resin, salts (sodium salts, ammonium salts, and the like) of a water-soluble resin (an acrylic water-soluble resin, a styrene acrylic water-soluble resin, a styrene maleic water-soluble resin and the like), a water dispersed resin and the like can also be used. Among the above mentioned water-soluble thickening resin, microbial polysaccharide and derivative thereof can preferably be used. A water-soluble thickening resin can be used alone or in combination of one, two or more. By using the above mentioned thickening agent, viscosity can be adjusted. In addition, when a pigment which has a settlement property in the ink is included as a colorant, which includes a metal powder pigment such as a metal coated glass flake pigment, a metal coated inorganic pigment, a metal oxide coated inorganic pigment, an aluminum powder pigment, and the like, a pigment which includes metal such as a metal foil, a film with metal deposited, a metal deposited film and the like, settlement of such a pigment can be inhibited. The above mentioned thickening agent is preferably contained in 0.001 to 10 wt % with respect to the total amount of the ink and more preferably, 0.01 to 5 wt %. Further preferably, the content is not greater than 3 wt % and most suitably, not greater than 1 wt %, and it is preferable that viscosity is controlled to the degree that a three-dimensional handwriting can be formed. The preferable viscosity of the ink is 5 to 100 mPa·s (an ELD viscometer, 1° 34' cone rotor, 10 rpm, 20° C.).

Further, when scaly silica is used as a colorant, the viscosity thereof is preferably 100 to 10000 mPa·s (an ELD viscometer, (not greater than 1000 mPa·s; 1° 34' cone rotor, not less than 1000 mPa·s; 3° cone rotor), 0.5 rpm, 20° C.). When the viscosity is less than 100 mPa·s, scaly silica is liable to settle and when the viscosity exceeds 10000 mPa·s, the ink flowage amount decreases and has the drawback of being hard to obtain a raised handwriting.

To produce the ink of the present invention, publicly known methods commonly used in the ink field can be employed. In addition, depending on cases required, processes for removing large particles such as filtering and the like may be added. For example, by putting all the materials and by stirring with a dissolver for 30 minutes, a desired ink can be obtained.

When the ink of the present invention is used for a writing instrument, it is desirable that flowage amount of the ink from the pen tip is at least 50 mg/10 m, that is, the flowage amount is not less than 50 mg when writing 10 m (detailed conditions are as stated in the measurement method in the later mentioned Examples). Further, the flowage amount of the ink from the pen tip is most suitably not less than 100 mg/10 m. By making the flowage amount of the ink of the present invention from the pen tip at least 50 mg/10 m, a three-dimensional handwriting with a thickness (three-dimensional height) of 20 to 50 μm and a smooth and matted handwriting surface can be obtained. When the flowage amount of the ink of the present invention from the pen tip is less than 50 mg/10 m, a three-dimensional handwriting with a smooth and matted handwriting surface is hard to obtain. Further, although the upper limit of the flowage amount of the ink from the pen tip is not limited, in order to obtain a preferable three-dimensional handwriting, it is desirable to set it not greater than 800 mg/10 m and further preferably not greater than 500 mg/10 m. In addition, when the flowage amount of the ink of the present invention from the pen tip exceeds 800 mg/10 m, it takes extreme time to dry and characters get crushed due to too thick a handwriting, which is not preferable for writing instruments such as ball-point pens and the like.

When obtaining such a preferable three-dimensional hand writing, ink viscosity is, as already mentioned, 5 to 100 mPa·s, preferably 5 to 50 mPa·s. In particular, the ink of the present invention with the viscosity of not less than 5 mPa·s to less than 50 mPa·s is preferable. In addition, the viscosity of the ink of the present invention is a measured value measured under the condition of using ELD viscometer, 1° 34' cone rotor, 10 rpm and under a temperature of 20° C.

Further, in order to impart a preferable three-dimensional handwriting, a writing instrument such as an ink-free ball-point pen and the like provided with a pen tip is used. And in more detail, the present invention relates to the writing instrument provided with a pen tip and an ink tube, wherein a water-based ink composition is contained inside of the above mentioned ink tube, the above mentioned ink composition is the water-based ink composition containing 2.5 to 50 wt % of white-colored resin particles, 2.5 to 50 wt % of film-forming resin emulsions in a solid content with respect to the total amount of the ink, wherein the ratio of said white-colored resin particles to said film-forming resin emulsions is 1:0.2 to 1:3 in a solid content and said white-colored resin particles and said film-forming resin emulsions in a solid content are contained in not less than 20 wt % in total, and flowage amount of said ink out of the above mentioned pen tip is at least 50 mg/10 m.

Therefore, the writing instrument of the present invention has a pen tip which is not composed of fiber bundles or resin moldings, but has a passage through which an ink of each kind of embodiments of the present invention flows out and by a valve such as a ball and the like, flowage of said ink is controlled, and the flowage amount of said ink from the pen tip is at least 50 mg/10 m and so, when writing using this writing instrument, a three-dimensional handwriting with a flat and a matted surface can be formed.

In particular, when a ball-point pen is provided with a pen tip with a ball and an ink tube, in obtaining a further preferable three-dimensional handwriting, such a ball-point pen is preferable in which a water-based ink composition containing 2.5 to 50 wt % of white-colored resin particles, 2.5 to 50 wt % of film-forming resin emulsions in a solid content with respect to the total amount of the ink, wherein the ratio of said white-colored resin particles to said film-forming resin emulsions is 1:0.2 to 1:3 in a solid content, said white-colored resin particles and said film-forming resin emulsions in a solid content are contained in not less than 20 wt % in total, and in which the ratio of handwriting thickness Y to ball diameter (diameter) X, that is, handwriting thickness Y (μm)×$10^3$/ball diameter (mm), or that is, Y×$10^3$/X (mm), is not less than 15, preferably not less than 20, and further preferably, not less than 25.

Further, such a ball-point pen is preferable in which a water-based ink composition containing 2.5 to 50 wt % of white-colored resin particles, 2.5 to 50 wt % of film-forming resin emulsions in a solid content with respect to the total amount of the ink, wherein the ratio of said white-colored resin particles to said film-forming resin emulsions is 1:0.2 to 1:3 in a solid content, said white-colored resin particles and said film-forming resin emulsions in a solid content are contained in not less than 20 wt % in total is contained in an ink tube, and the ratio of flowage amount Z of said water-based ink composition from said pen tip to said ball diameter (diameter) X, or that is, flowage amount of the ink (mg/10 m)/ball diameter (mm), or that is, Z/X is not less than 125, and preferably, not less than 150.

Further, such a ball-point pen is preferable in which a water-based ink composition containing 2.5 to 50 wt % of white-colored resin particles, 2.5 to 50 wt % of film-forming resin emulsions in a solid content with respect to the total amount of the ink, wherein the ratio of said white-colored resin particles to said film-forming resin emulsions is 1:0.2 to 1:3 in a solid content, said white-colored resin particles and said film-forming resin emulsions in a solid content are contained in not less than 20 wt % in total is contained in an ink tube, and as mentioned above, the ratio of handwriting thickness Y (μm)×$10^3$/ball diameter X (mm), or that is, Y×$10^3$/X (mm), is not less than 15 and in which flowage amount of the ink (mg/10 m)/ball diameter (mm), or that is, Z/X is not less than 125.

In order to make handwriting thickness (μm)×10³/ball diameter (mm), or that is, Y×10³/X (mm) not less than 15, for example, such a value can be obtained by regulating an ink component, viscosity and the like, a ball diameter, and the like. The same can be applied in order to make flowage amount of the ink (mg/10 m)/ball diameter (mm), or that is, Z/X not less than 125.

In addition, each upper limit of handwriting thickness (μm)/ball diameter (mm) and flowage amount of the ink (mg/10 m)/ball diameter (mm) is not specifically limited and is appropriately limited depending on a desired three-dimensional degree of handwriting.

As an example of a specific writing instrument preferably feasible for these, such a ball-point pen is preferable in which a water-based ink composition containing 2.5 to 50 wt % of white-colored resin particles, 2.5 to 50 wt % of film-forming resin emulsions in a solid content with respect to the total amount of the ink, wherein the ratio of said white-colored resin particles to said film-forming resin emulsions is 1:0.2 to 1:3 in a solid content, said white-colored resin particles and said film-forming resin emulsions in a solid content are contained in not less than 20 wt % in total is contained in an ink tube, said tip for writing instruments including a tip body for writing instruments and a ball for writing instruments, the tip body for writing instruments holding the ball near the distal end thereof, the tip body for writing instruments having a ball housing, a capillary hole, and a proximal hole, the ball housing, the capillary hole, and the proximal hole mutually communicating to form a channel for permitting an ink to flow, the ball housing having a side wall and a ball resting seat holding the ball rotatably and axially movably at a predetermined distance in the ball housing, the tip for writing instruments further having a broached ink channel or a hole so as to enable the ball housing to communicate with the capillary hole and the proximal hole, the ball housing further having a connecting surface that connects the seat with the side wall and has a truncated conical surface with its apex toward the distal end of the tip for writing instruments, and said seat is positioned inside of the connecting surface. Here, the truncated conical surface means a part of an imaginary cone and has the same shape as that of a trapezoidal rotator.

In addition, although it is not limited, said ball-point pen in which a ball urging member which urges said ball from a proximal end toward a distal end is provided in a compressed state inside of a tip is preferable.

In addition, although a ball-point pen is specified as one of the aforementioned writing instruments, writing or coating is available by soaking the ink of the present invention in a brush, a stick, and the like.

Figure 2:
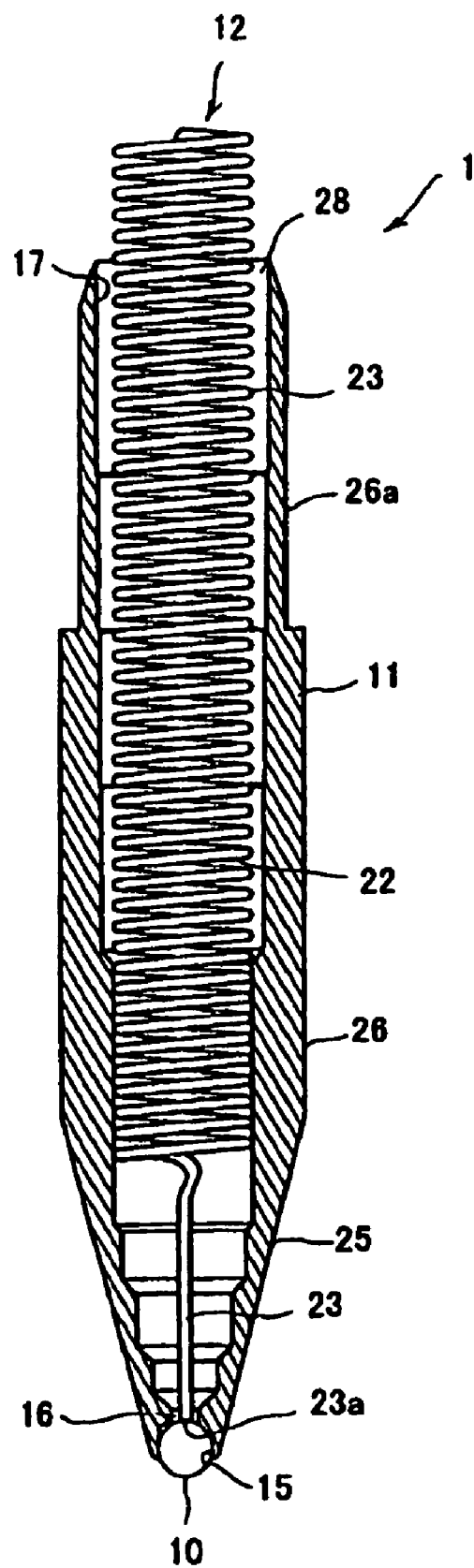
FIG. 2 is a cross-section of the ball-point pen tip.
Figure 3:
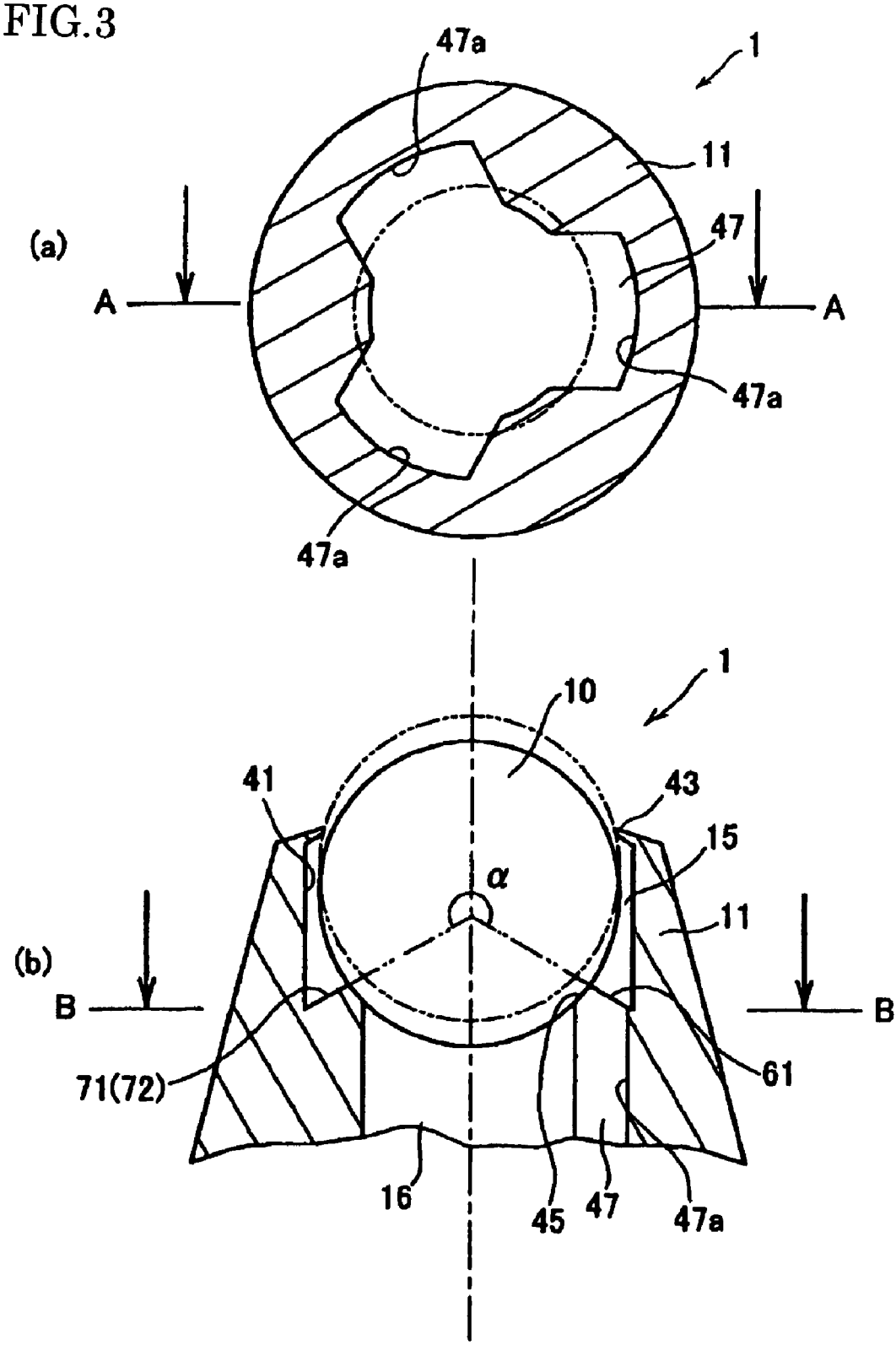
FIG. 3(a) is a cross-section of a distal end portion of the ball-point pen tip.
FIG. 3(b) is a cross-section of (a) taken along the lines A-A.
Figure 4:
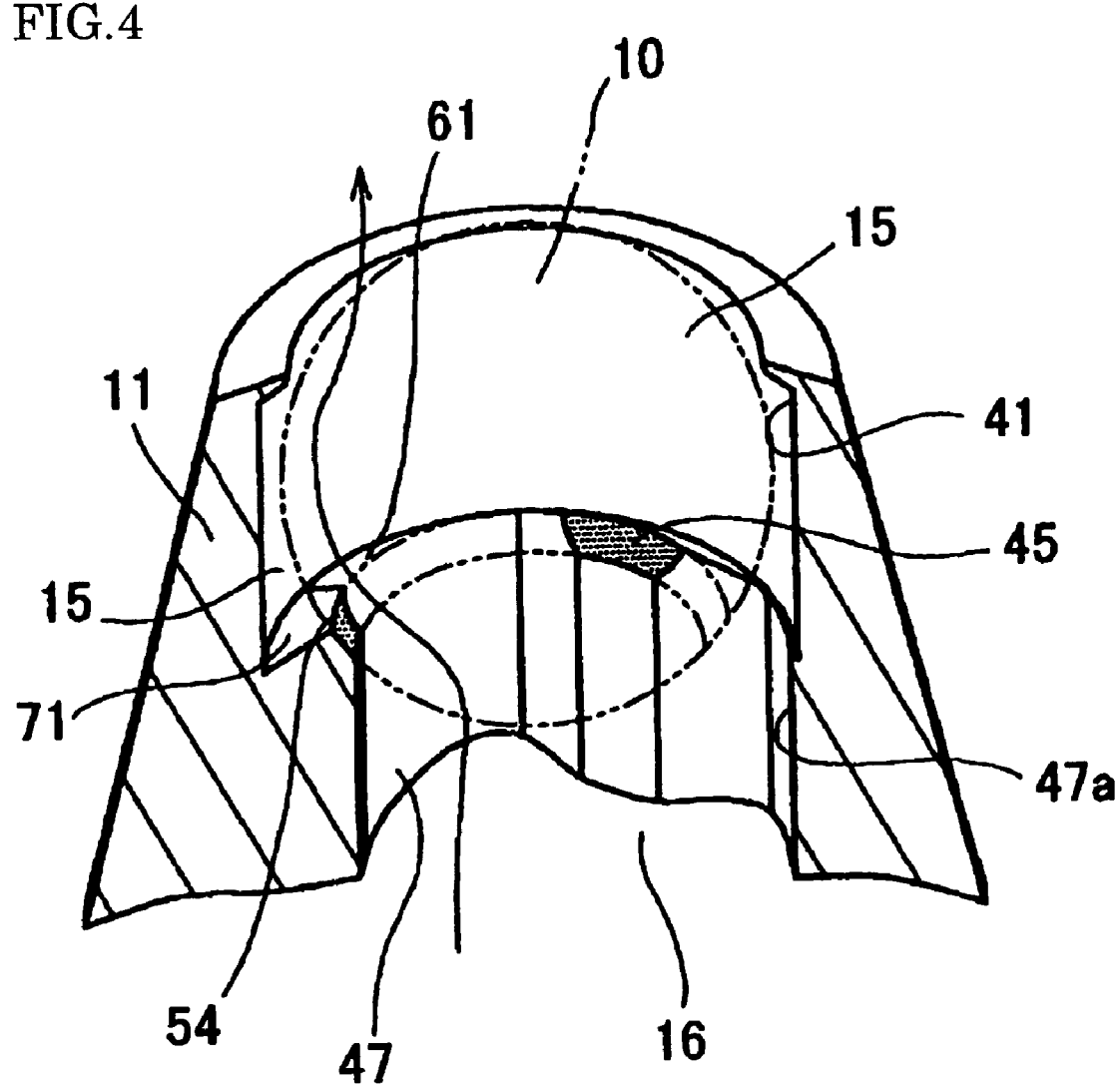
FIG. 4 is a perspective view of a distal end portion of the ball-point pen tip.
Figure 5:
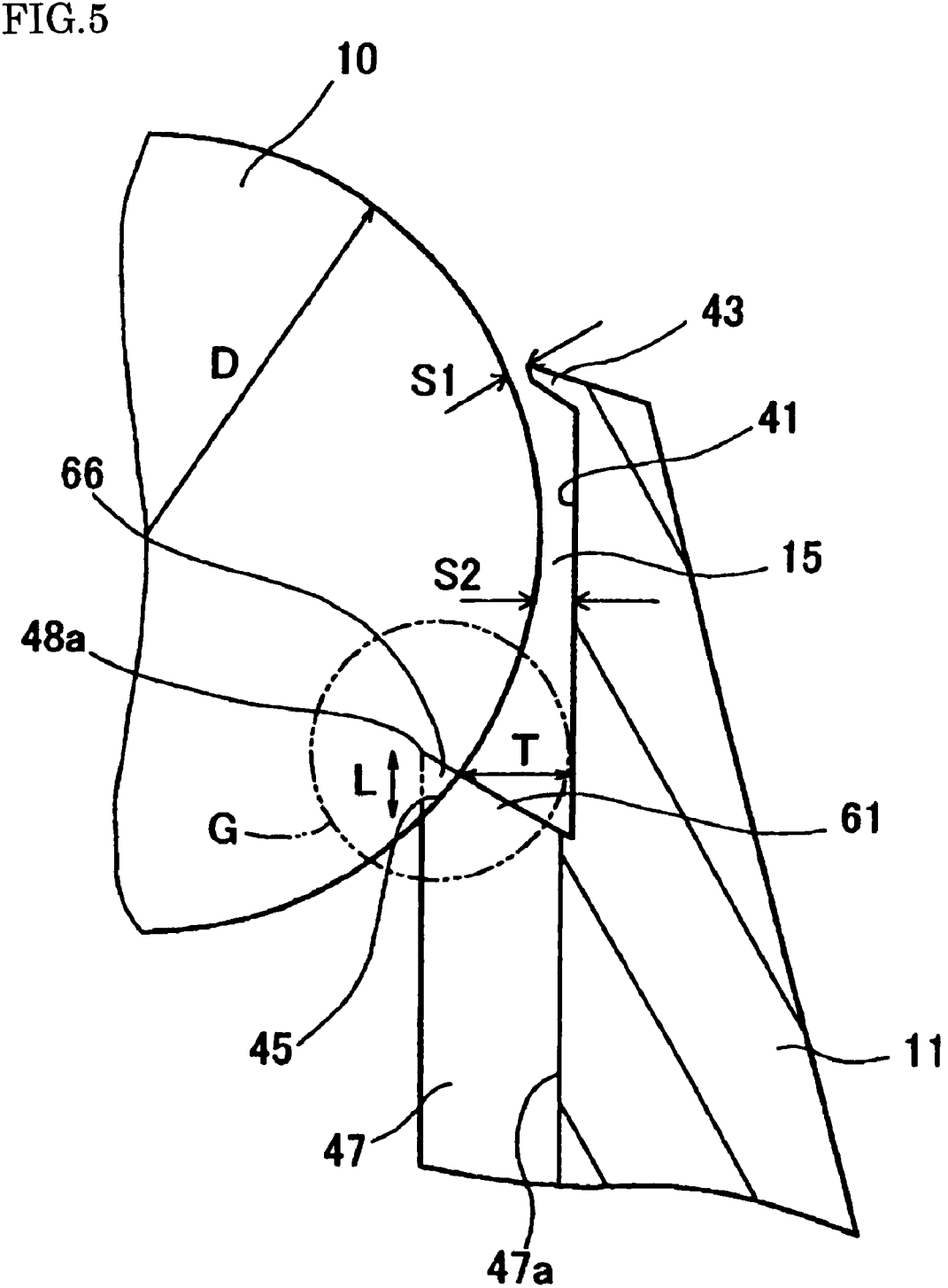
FIG. 5 is an enlarged view of a contact portion of a ball of the ball-point pen tip and a ball-point pen tip body.
Figure 6:
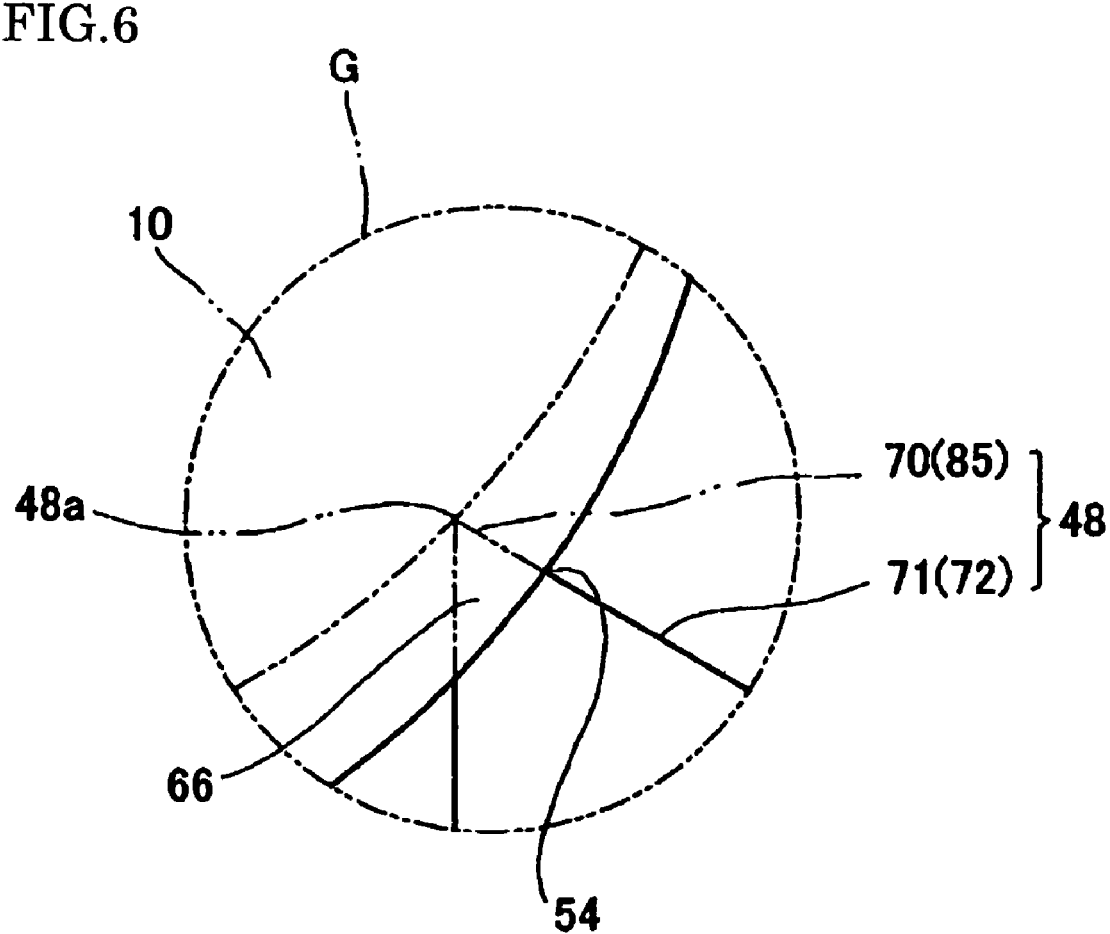
FIG. 6 is an enlarged view of a G portion of FIG. 5.

Hereinafter, one embodiment of said writing instruments is explained specifically in detail in accordance with figures. FIG. 1 is a cross-section showing a core having a tip for ball-point pens produced in a first embodiment of the present invention. FIG. 2 is a cross-section of said tip for ball-point pens. FIG. 3(*a*) is a cross-section showing a distal portion of the tip for ball-point pens and (*b*) is a cross-section of (*a*) taken along the line A-A in FIG. 3(*a*). FIG. 4 is a perspective view showing the distal end portion of the tip for ball-point pens. FIG. 5 is an enlarged view showing a spot where a ball in the tip is kept in contact with the tip body. FIG. 6 is an enlarged view of a G portion of FIG. 5.

A core 7 of a ball-point pen of the first embodiment of the present invention is shown in FIG. 1. Further, at the distal end of the core 7, a ball-point pen tip 1 (a tip for writing instruments) is attached. In addition, as shown in FIG. 1, a ball-point pen tip 1 is communicated with an ink cylinder 6 (a reservoir of the liquid to be applied) containing an ink 5 which is a water-based ink related to the present invention therein. In addition, the core 7 is inserted in a cylindrical shaft (not shown in figures) of the ball-point pen and is used as a water-based ball-point pen. 51 is an ink follower arranged at a proximal end of an ink in the ink cylinder 6, and according to the present invention, the ink follower is preferably used in a state where silicon oil is gelatinized and more preferably, in a state where silicon oil is gelatinized by benzylidenesorbitol, however, it is not limited thereto. In other words, in the present invention, a gelatinized involatile or a gelatinized refractory organic liquid such as silicon oil, mineral oil, polybutene, and the like are preferably used.

A ball 10 included in the distal end of the ball-point pen tip 1 is pushed against a writing surface such as a paper, so that the ink 5 is led out through the ball-point pen tip 1 adhering to the ball 10 in appropriate amount, thereby capable of writing.

As shown in FIG. 2, the ball-point pen tip 1 includes a ball-point pen tip body 11 (a tip body for writing instruments), a ball 10 and an urging member 12.

The tip body 11 has a substantially conical shape in its distal portion and a substantially cylindrical shape in its proximal portion, entirely appearing to be a rocket. In other words, the tip body 11 has a conically-shaped head 25 at its distal end, and a cylindrical shank 26 at its proximal end. The cylindrical 26 has at its proximal end a connecting step portion 26 *a* whose outside diameter is slightly reduced to be connected to the ink cylinder 6. The tip body 11 includes a ball housing 15, a capillary hole 16, and a proximal hole 17, all of which mutually communicate so as to form a series of flowage of an ink 5. The proximal hole 17 is open in a proximal end opening 28.

As shown in FIGS. 3 and 4, the ball housing 15 includes a side wall 41 having a shape of a cylindrical inner wall, a ball resting seat 45 that is located near the proximal end of the side wall 41, and a connecting surface 71 connecting the seat 45 to the side wall 41. As described below, the seat 45 is formed by tapping, or pressing the ball 10 from the distal end toward the proximal end, so as to be inwardly curved.

The connecting surface 71 has a truncated conical surface with its apex toward the distal end and forming α, an angle at the distal end of a cross-section of this truncated cone of 240°.

Furthermore, as shown in FIGS. 3 and 4, the tip body 11 has broached ink channels 47 axially arranged on its inside wall around the capillary hole 16, cylinder 6 to flow from the capillary hole 16 through the broached ink channels 47 and further outlets 61 of the broached ink channels 47 at the ball housing 15 to the ball housing 15.

The urging member 12 is a coiled spring and is accommodated in the tip body 11 as shown in FIG. 2, and is in a compressed state so as to push the ball 10 from the proximal end toward the distal end. To be specific, a rod-like portion 23 is provided at the distal end and the distal end 23*a* of the rod-like portion 23 contacts with a ball 10. And when the ball-point pen is not in use, said urging member 12 prevents ink 5 from flowing out, and when the ball-point pen is in use, writing pressure pushes the ball 10 toward the proximal end, thereby facilitating flowage of the ink 5.

The ball 10 is spherical and is accommodated and rotatably held in the ball housing 15 of the tip body 11. More specifically, the ball 10 is supported by the seat 45 at its bottom, by the side wall 41 on its side, and by a deformed edge 43 obtained by pressing the distal end of the side wall 41 of the tip body 11 inwards after the ball 10 being placed into the ball housing 15 as referred to below.

As shown in FIG. 5, the ball-point pen tip 1 in the present embodiment has gaps T existing against the ball 10 near the outlet 61 of the broached ink channel 47, the gap S2 existing at the spot where the ball 10 is nearest to the side wall 41 of the ball housing 15, and the gap S1 existing against the ball 10 near the deformed edge 43 of the tip body 11.

And when a ball-point pen 7 is used, the ink 5 flows out from the capillary hole 16 through the gap T of the outlet 61 of the broached ink channels 47 at the ball housing 15 to the ball housing 15, and further flows outside through the gap S1 via the gap S2.

The sizes of the gaps T, S1, and S2 are determined in accordance with the outside diameter D of the ball 10, the deformed amount L, and the inside diameter of the side wall 41 of the ball housing 15.

As the deformed amount L becomes larger, the gap S1 becomes wider, with the consequence of the fact that the distal edge 54 shifts outward, causing a decrease of the gap T with the ball 10 near the outlet 61 of the broached ink channel 47 in accordance with an increase in the deformed amount L. If the deformed amount L is decreased, the gap T becomes wider because of the inward shifting of the distal edge 54, but on the other hand the gap S1 becomes narrower.

In contrast, according to tip 1 in the present invention, since the pressure-deformation surface 70 is formed so as to be a truncated conical surface with its apex toward the distal end, the distal edge 54 is placed inward even when increasing deformed amount L, which leads to a relative increase of the gap T near the outlet 61 of the ball housing 15 of broached ink channel 47. Therefore, more amount of the ink 5 can be discharged since flowage of the already mentioned ink 5 of the present invention can be adjusted to be 50 mg/10 m. Therefore; when writing is made with this, a handwriting with a flat and matted surface, and three-dimensional handwriting can be formed.

It is also possible to make the gap S2 where the ball 10 nearest approaches the side wall 41 hard to be affected by deformation amount L to be narrower than either of the gaps T and S1 to ensure regulating of flow rate of the ink 5 by restricting excess flow of the ink 5 at the gap S2. That is, the known writing instruments cannot increase both the gaps S1 and T, and therefore, in order to regulate flowage at the gap S2, the gap S2 has to get narrower, thereby preventing an increase of flow rate of liquid. Furthermore, if the flow rate is regulated at the gaps S1 and T, the gaps S1 and T change in size because of the irregularity of the deformed amount L, failing to stably regulate the flow rate. In contrast, the tip 1 embodying the present invention can broaden both the gaps S1 and T, and further, the flow rate can be regulated at the gap S2, thereby ensuring precisely regulating flow rate in writing instruments using plenty of liquid effluent therefrom, making the flowage amount of the already mentioned ink 5 of the present invention 100 mg/10 m at least, and forming a hand writing with a flat and matted surface and three-dimensional handwritings.

For information, in FIG. 6, the machined surface 48 includes a pressure-deformation surface 70 deformed by tapping and the connecting surface 71. Referring to FIG. 6, the pressure-deformation surface 70 is tapped to be deformed into the seat 45 under the pressure of the ball 10.

The machined surface 48 has a shape of a truncated conical surface with its apex toward the distal end and a part of an imaginary cone. And the pressure-deformation surface 70 and the connecting surface 71 have a shape of a truncated conical surface with its apex toward the distal end and a part of an imaginary cone, too. The pressure-deformation surface 70 positions in the distal end. And the exterior angle α of the truncated conical surface at the distal end is 240°. In addition, the inner edge 48a of the machined surface 48 terminates at an acute angle.

Further, the pressure-deformation surface 70 is a first surface 85 that is conically shaped with its apex toward the distal end. The connecting surface 71 is a non-pressure surface 72, which is undeformable surface by tapping.

Although methods for producing such writing instruments are not specifically limited, a method of assembling a ball-point pen tip 1 as follows is preferable.

For example, first, the tip body 11 is formed. A solid cylindrical material is used, and the material is cut to produce the distal end of portion of the tip body into a substantially conical shape so as to produce the conically-shaped head 25, thereby forming a predetermined shape (the first process). Next, an inside of the ball housing 15 of the tip body 11 is processed so that it is provided with the side wall having a shape of a cylindrical inner wall and the machined surface 48 extending from the capillary hole edge of the side wall toward the axial center to a capillary hole 16, and in particular, processed so that a pressure-deformation surface 70 has a protruded portion at the distal end (the second process). Next, the broached ink channels 47 are formed thereby processing the tip body 11 (the third process). Next, the ball 10 is contained in the ball housing 15 and the distal end of the tip body 11 is deformed toward the ball 10 (the fourth process) Next, the pressure-deformation surface 70 which is a part of the machined surface 48 is deformed to form the seat 45 by pressing said ball 10 from the distal end to capillary hole 16 (the fifth process).

In addition, for example, in said second process, instead of processing the pressure-deformation surface 70 to have a protruded portion at the distal end, the method of processing the pressure-deformation surface 70 to have a first surface which is a shape of a side face of a truncated conical surface with its apex at the distal end of a tip for writing instruments can also be employed.

Figure 7:
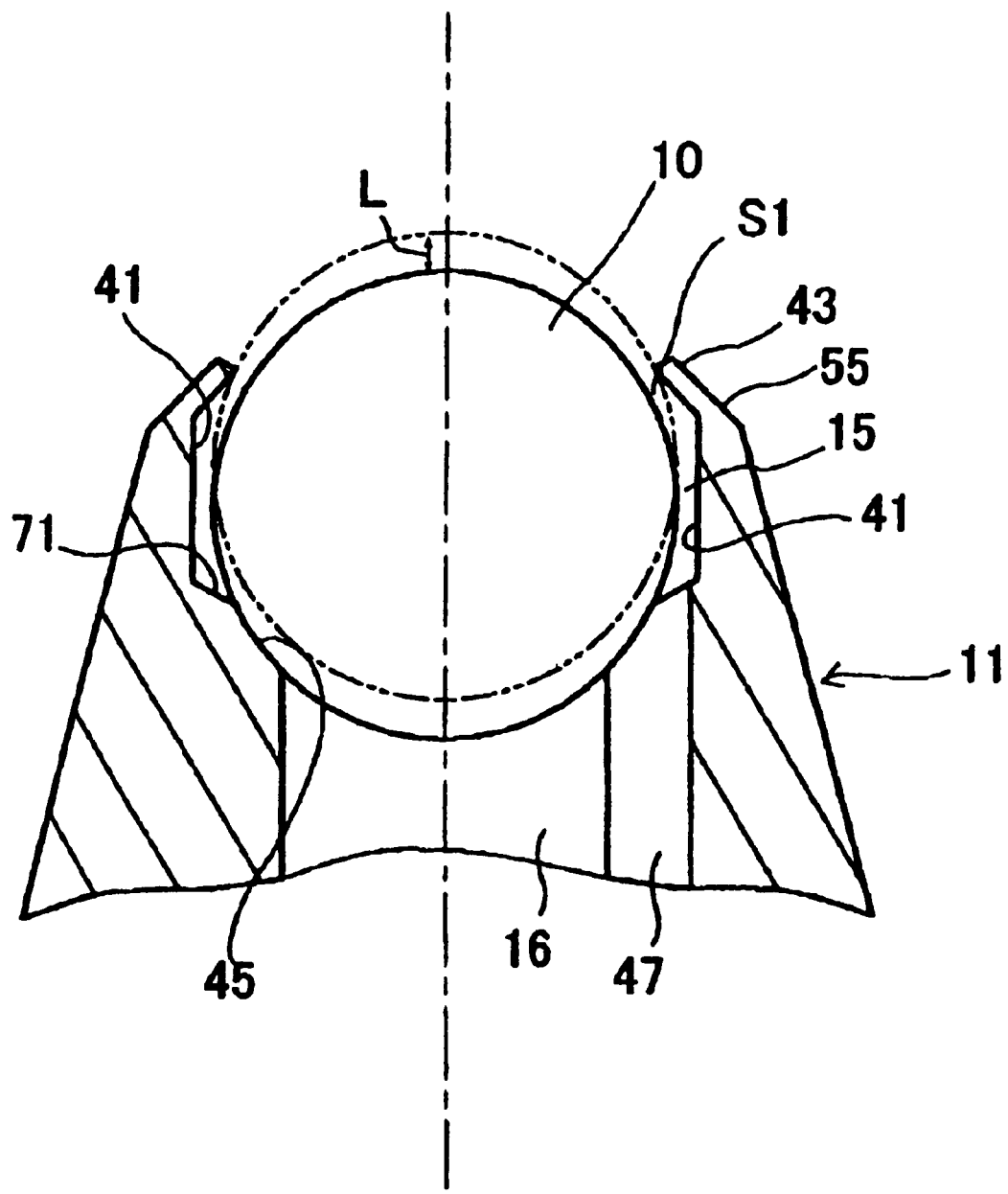
FIG. 7 is a cross-section showing the other embodiment of a distal end portion of a ball-point pen tip related to the writing instrument of the present invention.

Also, by the way, in a deformed edge 43 at the distal end of said tip body 11, in order to increase the flowage amount of the ink of the present invention, the structure of the second embodiment as shown in FIG. 7 can be employed.

That is, as shown in FIG. 7, it is the tip wherein the tip body 11 is substantially conical shaped, said tip has a ball housing 15 whose distal end is aperture like inside of said tip body 11, a ball 10 is contained in said ball housing 15, and a ball is axially movably at a predetermined distance in the ball housing, and by a deformed edge 43 obtained by pressing the distal end of the tip body 11 inwards after the ball 10 being placed into the ball housing 15, wherein the deformed edge 43 of said tip body 11 has outer portion 55 scraped circumferentially and said outer portion is deformed to the ball 10 together with said internal side.

Furthermore, as shown in FIG. 7, the tip body 11 has so-called broached ink channels 47 axially arranged around the capillary hole 16. And the broached ink channels 47 are connected to the ball housing 15 and the ink 5 can flow from the capillary hole 16 through the broached ink channels 47 and further outlets 61 of the broached ink channels 47 at the ball housing 15 to the ball housing 15. The ball 10 is spherical and is accommodated and rotatably held in the ball housing 15 of the tip body 11. That is, the ball 10 is supported by the seat 45 at its bottom, by the sidewall 41 on its side, and by a deformed edge 43 obtained by pressing the distal end of the side wall 41 of the tip body 11 inwards after the ball 10 being placed into the ball housing 15.

Said ball housing 15 includes a side wall 41 having a shape of a cylindrical inner wall, a ball resting seat 45 that is located near the proximal end of the sidewall 41, and a connecting surface 71. The connecting surface 71 is the surface connecting the side wall 41 having a shape of a cylindrical inner wall and the seat 45. The seat 45 is formed by tapping, or pressing the ball 10 from the distal end toward the proximal end. The shape of the connecting surface 71 is a part of an imaginary cone and it is mortar shaped.

In the ball-point pen tip 1 of the present embodiment, a ball 10 can move to the proximal end by tapping, and as shown in FIG. 7, the gap S1 is formed between the ball 10 and a deformed edge 43 of the tip body 11. In addition, since the seat 45 is formed by tapping, the whole shape of the seat 45 is in line with a curved surface of the ball 10. And at the time of usage and the like, when the ball 10 is pushed from the distal end to the seat 45, the whole seat 45 contacts with the ball 10. For information, in FIG. 7, L is the deformed amount by tapping which is a distance where the ball is movable by tapping.

Figure 8:
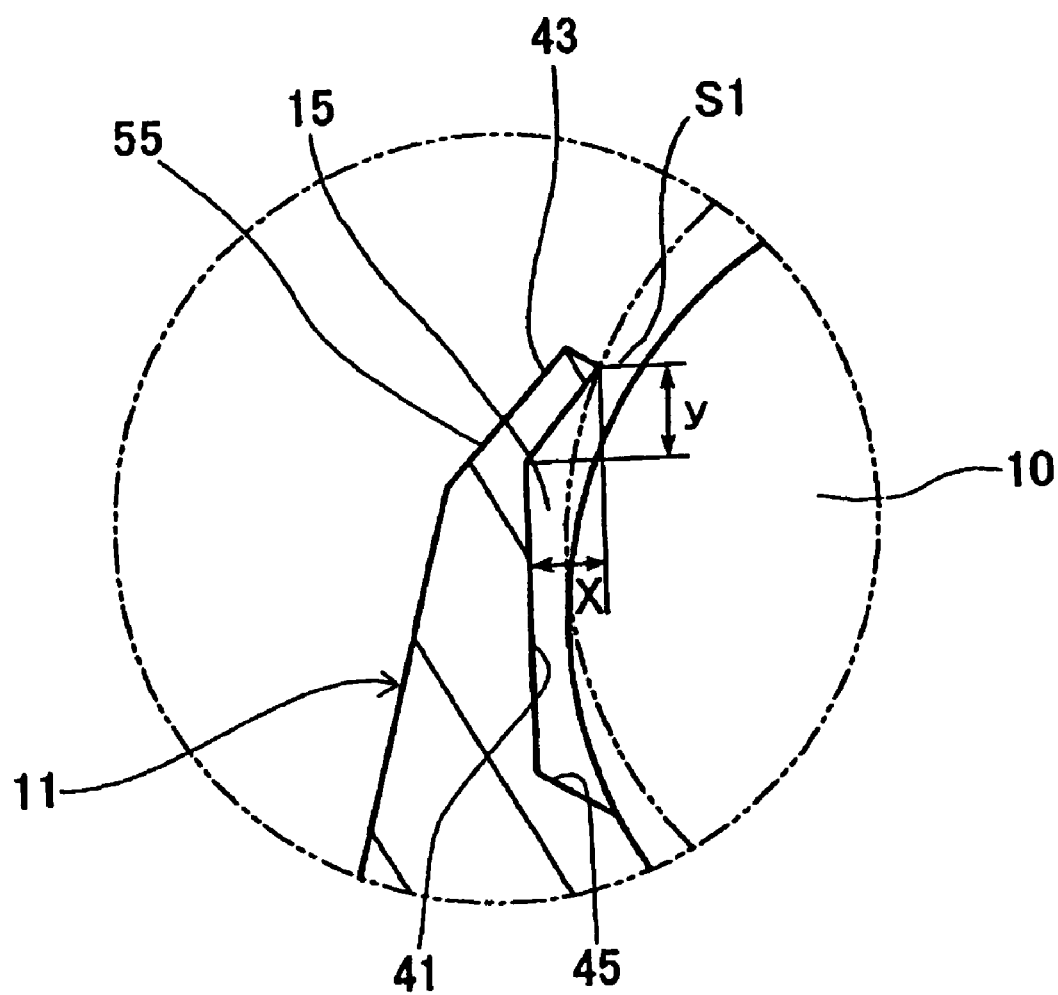
FIG. 8 is an enlarged cross-section of the chief part thereof.

In order to increase the flowage amount of the ink 5 stably, as shown in FIG. 8, as shown in FIG. 8, it is desirable to have a structure in which internal side of the deformed edge 43 is shortened and inclined as much as possible. In other words, the structure is that length y in the axis direction is made smaller in respect of a distance x in the diameter direction of the deformed edge 43 of a ball-point pen tip 1. By taking such a structure, the deformed edge 43 is inclined more to the axis of a ball-point pen tip 1. And the deformed edge 43 with the larger inclination allows the space 66 in the ball housing 15, which improves the flowage of the ink 5 at the time of usage.

In order to produce these ball-point pen tips, for example, the outer shape of the tip body 11 is processed to be substantially conical (the first process). Next, in the vicinity of the distal end in the outer side of the tip body 11 is scraped circumferentially and the scraped portion is deformed to the ball side (the second process). Next, the ball housing 15 whose distal side is an aperture is formed in side of a tip body 11 (the third process). Next, a broached ink channel 47 is formed which connects to a capillary hole 16 and is obtained by scraping the wall surface of a capillary hole 16 outward (the fourth process). Next, a deformed edge 43 is provided by containing a ball 10 in said ball housing 15 and by deforming the distal end of the tip body 11 to the ball 10 side (the fifth process). With these series of processes, writing instruments provided with said tips can be produced.

For information, in a ball-point pen tip of the above mentioned embodiment, the shape of the first surface of circumferentially scraped outer side portion (circumferentially scraped portion) 55 as already mentioned is a side face of a truncated cone and at the edge portion of the proximal end, an angle is formed. Therefore, when writing with a ball-point pen tip of said embodiment, the edge in the proximal end scratches what is written, thereby generating possibility of deteriorating writing feeling. A ball-point pen tip which solves this problem has the curved shape in which the shape of the first surface of the above mentioned circumferentially scraped portion 55 protruding outward. In addition, there is no angle at the edge of the proximal end of the first surface, and the edge of the proximal end portion of the first surface is connected smoothly to form continuous surfaces. Therefore, when writing with a ball-point pen tip produced by a ball-point pen tip, there is no concern of scratching and therefore, there is no concern of deteriorating the writing feeling.

For information, although writing instruments which apply the ink of said present invention are not specifically limited, it is desirable to employ the writing instruments with embodiment related to the seat face of said tip and embodiment related to the distal end of said tip selectively or both.

EXAMPLES

Inks of Examples and Comparative Examples with compositions shown in a table 1 were produced. In other words, each component shown in a table 1 was respectively compounded, followed by stirring by a dissolver for 30 minutes, thereby obtaining inks of Examples and Comparative Examples. For information, in the tables, compounding amount is represented by wt % and each component is as follows. In addition, in the table, "resin in the ink (in a solid content)" shows the total amount of white-colored resin particles and film-forming resin emulsions in a solid content in the ink shown in table 1. Further, "white-colored resin particles: film-forming resin emulsions (in a solid content)" shows the compounding ratio of dispersion of white-colored resin particles in a solid content and film-forming resin emulsions (in a solid content).

(Film-Forming Resin Emulsion)

Nikazol RX866D (manufactured by Dainippon Ink and Chemicals, Incorporated, acrylic series resin emulsion, solid content 50%)

0561 (manufactured by JSR CO., LTD., SBR series, solid content 69%)

AE517 (manufactured by JSR CO., LTD., acrylic series resin emulsion, solid content 47%)

UCOAT UWS145 (manufactured by Sanyo Chemical Industries Ltd, urethane series, solid content 35%)

Polyzol PSA SE1300 (manufactured by Showa Highpolymer Co., Ltd., acrylic series, solid content 50%)

Superflex 500 (manufactured by Daiichi Kogyo Seiyaku Co., Ltd., urethane series, solid content 45%)

For information, water is included in the above mentioned resin emulsions.

(White-Colored Resin Particles)

Muticle PP240D (manufactured by Mitsui Toatsu Chemicals Inc., flat white-colored resin particles, dispersion, average particle diameter: 0.5 μm), Ropaque HP1055 (manufactured by Rohm and Haas Company, hollow white-colored resin particles, dispersion, average particle diameter: 1.0 μm), Ropaque ultra (manufactured by Rohm and Haas Company, hollow white-colored resin particles, dispersion, average particle diameter: 0.3 μm)

LX407BP6 (manufactured by Zeon Corporation, tightly compacted (rigid) white-colored resin particles, dispersion, average particle diameter: 0.2 μm)

(Colorant)

NKW 6238 (manufactured by NIPPON KEIKO CO., LTD, blue colored fluorescent colorant)

NKW 6007 (manufactured by NIPPON KEIKO CO., LTD, red colored fluorescent colorant)

SUNLOVELYLFS HN-020 (scaly silica manufactured by Doukai Chemical Industry Co., Ltd., average particle diameter 0.2 μm, solid content 15 to 17%)

SUNLOVELYLFS HN-050 (scaly silica manufactured by Doukai Chemical Industry Co., Ltd., average particle diameter 0.5 μm, solid content 15 to 17%)

Next, each of these inks was filled in an ink tube of a water-based ball-point pen with a structure shown in said FIGS. 1 to 6. An ink tube is made of polypropylene, a ball house is made of stainless, a ball is made of silicon carbide, and a ball diameter (diameter) is 0.8 mm.

Subsequently, using this writing instrument, writing performance was evaluated. In other words, writing was conducted on PPC paper with the above mentioned pen and a state of a written line was evaluated by visual observation and hand feeling.

(Evaluation Criteria)

Matted degree of handwritings: ⊚: handwritings are observed as remarkable matted tone.

○: handwritings are observed as matted tone

X: luster is observed in handwritings.

Rise of handwritings: ○: rise is recognized by hand feeling.

X: no rise is recognized by hand feeling.

Measurement of Thickness of Handwritings:

Thickness of written lines written as "KABUSHIKI-GAISHA" on PPC paper was measured by a measuring device whose trade name is "DIAL THICKNESS" (manufactured by TECLOCK CO., LTD.).

Evaluation of Ink Flowage Amount (Measuring Method):

With a spiral continuous writing machine whose trade name is "MODEL TS-4C-10" (manufactured by Seiki Manufacturing Co., Ltd), loss (mg) after 10 m of writing was measured. Writing condition is that writing angle of 65°, load of 100 g, and writing speed of 7 cm/sec.

TABLE 1

| Composition | Solid content | Examples |  |  |  |  |  |  |
|---|---|---|---|---|---|---|---|---|
| | | 1 | 2 | 3 | 4 | 5 | 6 | 7 |
| Muticle PP240D | 44% | 50.00 | | | | 40.00 | | |
| Ropaque HP1055 | 27% | | 50.00 | | | | 60.00 | |
| Ropaque Ultra | 30% | | | 60.00 | | | | 70.00 |
| LX407BP6 | 50% | | | | 40.00 | | | |
| Nikazol RX866D | 50% | 30.00 | | | | | | 15.00 |
| 0561 | 69% | | 45.00 | | | | | |
| AE517 | 47% | | | 50.00 | | | | |
| Ucoat UWS145 | 35% | | | | 50.00 | | | |
| Polyzol PSA SE1300 | 50% | | | | | 40.00 | | |
| Superflex 500 | 45% | | | | | | 20.00 | |
| Sunlovely LFS HN-020 | 15-17% | | | | | | | |
| Sunlovely LFS HN-050 | 15-17% | | | | | | | |
| NKW-6238 | | 0.50 | 0.75 | | 0.75 | | | 0.50 |
| NKW-6007 | | | | 1.00 | | 0.75 | | |
| Ion exchange water | | Remnant | Remnant | Remnant | Remnant | Remnant | Remnant | Remnant |
| Total | | 100 | 100 | 100 | 100 | 100 | 100 | 100 |
| Physical property | | | | | | | | |
| Resin emulsion in the ink (solid content) | | 37.00 | 44.55 | 41.50 | 37.50 | 37.60 | 25.20 | 28.50 |
| White-colored resin emulsion: film-forming resin emulsion (solid content) | | 1:0.68 | 1:2.30 | 1:1.31 | 1:0.88 | 1:1.14 | 1:0.56 | 1:0.36 |
| Effect | | | | | | | | |
| Matted degree of a handwriting | | ○ | ○ | ○ | ○ | ○ | ○ | ○ |
| Rise of a handwriting | | ○ | ○ | ○ | ○ | ○ | ○ | ○ |
| Thickness of a handwriting (μm) | | 30 | 35 | 25 | 25 | 35 | 20 | 25 |

| Composition | Examples |  |  | Comparative Examples |  |  |
|---|---|---|---|---|---|---|
| | 8 | 9 | 10 | 1 | 2 | 3 |
| Muticle PP240D | | 50.00 | 40.00 | 20.00 | | 15.00 |
| Ropaque HP1055 | | | | | | |
| Ropaque Ultra | | | | | | |
| LX407BP6 | 40.00 | | | | 80.00 | |
| Nikazol RX866D | | 30.00 | | | | |
| 0561 | 50.00 | | | 60.00 | | |
| AE517 | | | | | | |
| Ucoat UWS145 | | | | | 10.00 | |
| Polyzol PSA SE1300 | | | 40.00 | | | |
| Superflex 500 | | | | | | 15.00 |
| Sunlovely LFS HN-020 | | 10.00 | | | | |
| Sunlovely LFS HN-050 | | | 10.00 | | | |
| NKW-6238 | | 0.50 | | 0.75 | | |
| NKW-6007 | 0.50 | | 0.75 | | 0.50 | 0.50 |
| Ion exchange water | Remnant | Remnant | Remnant | Remnant | Remnant | Remnant |
| Total | 100 | 100 | 100 | 100 | 100 | 100 |
| Physical property | | | | | | |
| Resin emulsion in the ink (solid content) | 54.50 | 37.00 | 37.60 | 50.20 | 43.50 | 13.35 |
| White-colored resin emulsion: film-forming resin | 1:1.73 | 1:0.68 | 1:1.14 | 1:4.70 | 1:0.15 | 1:2.22 |

TABLE 1-continued

| | | | | | | |
|---|---|---|---|---|---|---|
| emulsion (solid Effect | | | | | | |
| Matted degree of a handwriting | ○ | ⊚ | ⊚ | X | X | ○ |
| Rise of a handwriting | ○ | ○ | ○ | ○ | ○ | X |
| Thickness of a handwriting (μm) | 35 | 30 | 35 | 30 | 25 | 10 |

From a table 1, it is found in order to obtain raised handwritings, the resin in the ink should be contained in not less than 20% and that the luster in the handwritings disappears and matted handwritings can be obtained by making the ratio of white-colored resin particles and resin emulsions 1:0.2 to 1:3 in solid content. And further, when the solid content of resin emulsions is too much, although the coated film is considered to get smooth, luster appears and when on the other hand, the white-colored resin particles are too many, the luster is observed, too.

In every ink in Examples, raised and matted handwritings are acknowledged.

INDUSTRIAL APPLICABILITY

As heretofore mentioned, the water-based ink composition of the present invention can form raised, three-dimensional, and matted handwritings. Since the water-based ink composition of the present invention can form three-dimensional matted handwriting films, it can be applied to writings or drawings on paper, nails, bodies, and the like and it can also be applied to matted cosmetic compositions which cannot be seen conventionally. For information, the specification of the present invention claims the benefit of Japan patent applications No. 2004-231516 and No. 2004-335308 and the same contents thereof are taken herein as references.

What is claimed is:

1. An ink-free type writing instrument, comprising:
a pen tip; and
an ink tube,
wherein a water-based ink composition is contained inside the ink tube,
the water-based ink composition comprises 2.5 to 50 wt % of white-colored resin particles, and 2.5 to 50 wt % of film-forming resin emulsions in a solid content with respect to the total amount of the ink,
the film-forming resin emulsions have a glass transition temperature of not greater than 0° C.,
the ratio of said white-colored resin particles to said film-forming resin emulsions is 1:0.2 to 1:3 in a solid content,
said white-colored resin particles and said film-forming resin emulsions in a solid content are contained in not less than 20 wt % in total, and
a flowage amount of said ink out of the pen tip is at least 50 mg/10 m such that a three-dimensional handwriting having a thickness of 20 to 50 μm can be obtained.

2. The writing instrument as set forth in claim 1, wherein said white-colored resin particles are contained in 5 to 30 wt % and said film-forming resin emulsions are contained in 5 to 30 wt % in a solid content.

3. The writing instrument as set forth in claim 1, wherein the ratio of said white-colored resin particles to said film-forming resin emulsions is 1:0.5 to 1:2 in a solid content.

4. The writing instrument as set forth in claim 1, wherein said white-colored resin particles are hollow white-colored resin balls.

5. The writing instrument as set forth in claim 1, wherein said white-colored resin particles are flat white-colored resin particles.

6. The writing instrument as set forth in claim 1, wherein at least two resin particles selected from the group of rigid white-colored resin balls, hollow white-colored resin balls, and flat white-colored resin particles are contained as said white-colored resin particles.

7. The writing instrument as set forth in claim 1, wherein an average particle diameter of said white-colored resin particles is not greater than 1.5 μm.

8. The writing instrument as set forth in claim 1, wherein an average particle diameter of said film-forming resin emulsions contains resin particles with an average particle diameter of 0.05 to 0.5 μm.

9. The writing instrument as set forth in claim 1, further containing a scaly silica as a colorant.

10. The writing instrument as set forth in claim 9, wherein an average particle diameter of said scaly silica is 0.2 to 6 μm and 0.01 to 20 wt % of said scaly silica is contained.

11. The writing instrument as set forth in claim 1, wherein the film-forming resin emulsions are acrylic series resin emulsions.

12. The writing instrument as set forth in claim 1, wherein the film-forming resin emulsions are urethane series resin emulsions, styrene butadiene (SBR) series resin emulsions or acrylonitrile butadiene series resin emulsions.

13. The writing instrument as set forth in claim 1, the water-based ink composition has a viscosity of 5 to 100 mPa·s when measured using ELD viscometer, 1° 34' cone rotor, 10 rpm and under a temperature of 20° C.

14. The writing instrument as set forth in claim 1, wherein the pen tip includes a ball, and a handwriting thickness Y (μm)×$10^3$/ball diameter X (mm) of said writing instrument is not less than 15.

15. The writing instrument as set forth in claim 1, wherein the pen tip includes a ball, and a flowage amount Z of the ink of said writing instrument (mg/10 m)/ball diameter X (mm) is not less than 60.

16. The writing instrument as set forth in claim 1, wherein the pen tip includes a ball, and a handwriting thickness Y (μm)×$10^3$/ball diameter X (mm) is not less than 15 and a flowage amount Z of the ink of said writing instrument (mg/10 m)/ball diameter X (mm) is not less than 125.

* * * * *